(12) United States Patent
Cho

(10) Patent No.: US 8,059,612 B2
(45) Date of Patent: Nov. 15, 2011

(54) METHOD AND TERMINAL FOR RECEIVING A DIGITAL BROADCAST

(75) Inventor: Nam Shin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 1339 days.

(21) Appl. No.: 11/457,790

(22) Filed: Jul. 14, 2006

(65) Prior Publication Data

US 2007/0019588 A1    Jan. 25, 2007

(30) Foreign Application Priority Data

Jul. 14, 2005    (KR) .................. 10-2005-0063711

(51) Int. Cl.
  *H04B 7/216*    (2006.01)
(52) U.S. Cl. ........ 370/335; 370/320; 370/328; 370/342; 455/454; 455/455; 455/414.3; 455/3.01; 455/3.03; 455/3.04; 455/3.05; 455/3.06
(58) Field of Classification Search ................ 455/454, 455/455, 414.3, 3.01, 3.02, 3.03, 3.04, 3.05, 455/3.06; 370/320, 328, 335, 342
See application file for complete search history.

(56) References Cited

U.S. PATENT DOCUMENTS
6,763,522 B1 * 7/2004 Kondo et al. .................. 725/39

FOREIGN PATENT DOCUMENTS
| JP | 11-308580 | 11/1999 |
| JP | 2001016513 | 1/2001 |
| JP | 2003250134 | 9/2003 |
| JP | 2005124144 | 5/2005 |
| KR | 10-20000045549 A | 7/2000 |

* cited by examiner

*Primary Examiner* — Justin Lee
(74) *Attorney, Agent, or Firm* — Lee, Hong, Degerman, Kang & Waimey

(57) ABSTRACT

A method and a digital broadcast receiving terminal are provided. The terminal includes a receiving unit, a decoder, a memory, and a controller. The receiving unit receives a digital multimedia broadcast transport stream and the decoder decodes data included in the transport stream. The memory stores system information obtained from a previously received transport stream. The controller provides a signal for controlling an initial broadcast receiving operation of the terminal using information stored in the memory to reduce an initial operating time required for the terminal to receive a broadcast.

9 Claims, 6 Drawing Sheets

METHOD AND TERMINAL FOR RECEIVING A DIGITAL BROADCAST

CROSS-REFERENCE TO RELATED APPLICATIONS

This application claims the benefit of Korean Patent Application No. 10-2005-0063711, filed on Jul. 14, 2005, which is hereby incorporated by reference as if fully set forth herein.

FIELD OF THE INVENTION

The present invention relates to a digital broadcast receiving terminal, and more particularly, to a digital broadcast receiving terminal and method that can reduce the time required to perform an initial receiving operation and also can increase the reception rate.

BACKGROUND OF THE INVENTION

A digital broadcast receiving terminal uses a Code Division Multiplexing (CDM) channel to demodulate a received signal. The CDM channel includes three system information channels and two media channels. The system information channels are control channels rather than broadcast data channels. The media channels are channels that carry broadcast service content.

The system information channel includes a pilot channel, a Conditional Access System (CAS) channel, and an Electronic Program Guide (EPG) channel. The receiving terminal ("terminal" or "receiver") must continuously receive the system information channels, no matter what channel the user views. The receiver must continuously monitor the system information to determine whether or not it has been updated. When the user attempts to receive a digital broadcast, the receiver must first obtain system information in order to allow the user to view a desired channel broadcast.

Using pilot channel configuration information, the receiver can determine which CDM channel contains Program Specific Information (PSI)/Service Information (SI). Such system information items have different transmission periods (or intervals) according to their importance. In order to quickly enter its initial receiving operation, the receiver must quickly obtain information items having a short transmission period.

When a conventional satellite digital multimedia broadcast (DMB) receiver enters an initial receiving operation, the receiver sequentially obtains the pilot channel configuration information, obtains the PSI, a decodes an A/V channel, and the like as illustrated in a flow chart of FIG. 1.

When a user attempts to view or listen to a broadcast (S101), the receiver allows the user to select a channel using a Service Description Table (SDT) that has been stored in order to provide at least channel information such as a channel list and a channel name to the user (S102).

The receiver then achieves pilot channel synchronization (S103). Only after the pilot channel synchronization is achieved, the receiver can properly demodulate the CDM channel.

After achieving the pilot channel synchronization, the receiver first obtains CDM channel configuration information received in a pilot channel and transfers it to a controller (specifically, a Main Processing Unit (MPU)) (S104).

The controller determines a CDM channel which must be demodulated in order to obtain PSI/SI, and starts obtaining PSI/SI (S105).

The receiver obtains the PSI required to demodulate a broadcast channel (specifically, a PAT*, a PMT*, and a CAT* corresponding to a channel actually selected by the user) to extract audio/video and CAS-related PIDS* of the channel actually selected by the user. Applying bit de-interleaving to the satellite DMB causes a time delay of about 3.5 seconds or more after the receiver starts extracting PSI. Using the CDM channel configuration information and PSI, it is possible to determine CDM channels which must be demodulated in order to decode an audio/visual channel corresponding to the channel actually selected by the user (S106).

The receiver starts demodulating the determined CDM channels to provide audio/video to the user (S107). As described above, applying bit de-interleaving to the satellite DMB causes a time delay of about 3.5 seconds or more after the receiver starts extracting PSI. While receiving the broadcast, the receiver continuously monitors CDM channel configuration information and PSI/SI to determine whether or not it has been updated. If the CDM channel configuration information or PSI/SI has been updated, the receiver replaces the previous information with the updated information (S108).

The PSI among the system information (PSI/SI) has a short transmission period since the PSI directly relates to the receiver's operation. The receiver can operate properly only after obtaining the PSI. Service information, which is provided for system operation and user convenience, has a long transmission period.

The pilot channel is used not only to achieve received signal synchronization but also to carry CDM channel configuration information. The CDM channel configuration information is used to indicate configuration information which other channels contain. Specifically, the CDM channel configuration information indicates the CDM channels that carry other PSI/SI and A/V data items. In combination with the PSI/SI, the CDM channel configuration information may be used as a basis for determining which CDM channel must be demodulated to view a given channel number. Accordingly, the receiver operates in the following order. First, the receiver achieves synchronization through a pilot channel. Next, the receiver obtains CDM channel configuration information of the pilot channel and then obtains PSI/SI based on the obtained CDM channel configuration information. The receiver then starts demodulating a CDM channel corresponding to the channel selected by the user.

The conventional digital broadcast receiver usually achieves synchronization through a pilot channel. Thereafter, when the receiver is stabilized, it obtains CDM channel configuration information. The CDM channel configuration information is transferred to the MPU. The MPU analyzes the CDM channel configuration information to obtain PSI/SI. The receiver obtains the PSI after obtaining the CDM channel configuration information. Thus, even in a good wireless environment, a longer time is required to initially receive a digital broadcast than to change channels. Thus the initialization process requires additional time to obtain the CDM channel configuration information and to perform the PSI/SI CDM bit de-interleaving.

In order to quickly achieve synchronization, bit interleaving is not applied to a pilot signal that carries CDM channel configuration information and a digital broadcast synchronization signal. Instead, the pilot channel typically uses transmission power that is about 3 dB (or twice) higher than other channels. However, the pilot channel is vulnerable to burst errors because it uses no bit interleaving. Almost no packet error or bit error occurs in other CDM channels after Viterbi demodulation due to the characteristics of wireless environments. However, many errors occur in the pilot channel since the pilot channel does not use bit interleaving. Thus, in a weak electric field, it is difficult or takes a long time to obtain CDM channel configuration information carried in the pilot channel. For example, when a receiver attempts to receive a digital broadcast in a weak electric field, it may take a long time (or may not be possible) for the receiver to receive the broadcast although a nearby user is able to view a digital broadcast.

SUMMARY OF THE INVENTION

Accordingly, the present invention is directed to a method and a digital broadcast receiving terminal for receiving a digital broadcast that substantially obviate one or more problems due to limitations and disadvantages of the related art.

An object of the present invention is to provide a method and terminal for receiving a digital broadcast that can reduce the time required to initialize for receiving a broadcast.

Another object of the present invention is to provide a method and terminal for receiving a digital broadcast that can increase the success rate of initializing for receiving a broadcast.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital broadcast receiving terminal and a method for initializing the terminal are characterized in that, when upon initializing the terminal for receiving a broadcast, the initialization is controlled using information stored in a memory in order to reduce the initialization time.

Preferably, the information stored in the memory is updated each time changed information corresponding to the stored information is received in the broadcast.

Preferably, a receiving operation of the terminal, which is to be performed, is determined according to the difference between information stored in the terminal's memory and information extracted from an actually received broadcast signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In the present invention, when a user attempts to listen to or view a satellite DMB using a satellite DMB receiver, the receiver initializes using stored system information before obtaining actual system information from a received satellite DMB signal. For fast operation, the receiver uses stored CDM channel configuration information and PSI (PAT, PMT, and CAT)/SI or stored CDM channel configuration information and SI.

Figure 1:
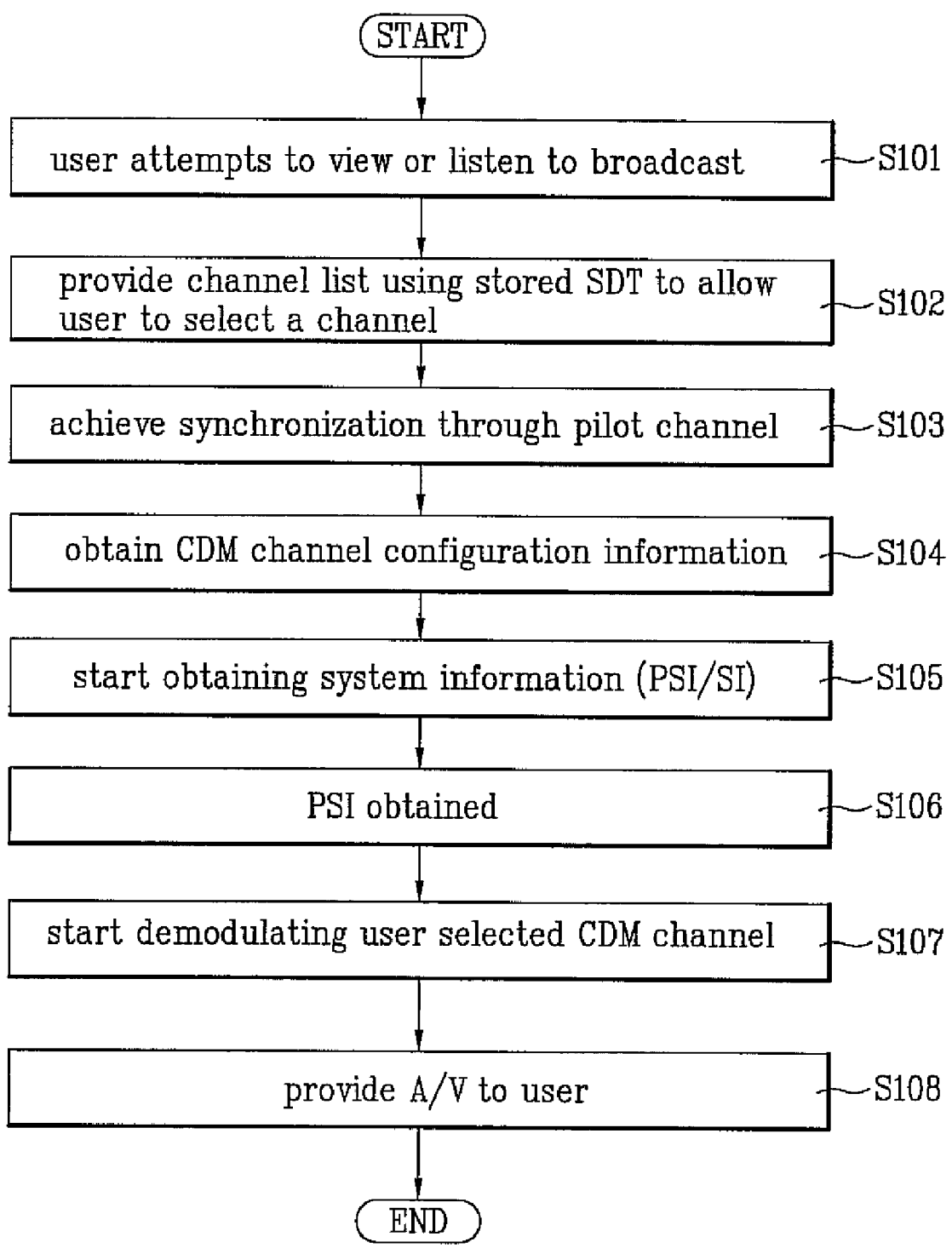
FIG. 1 is a flow chart of a conventional digital broadcast receiving method.
Figure 2:
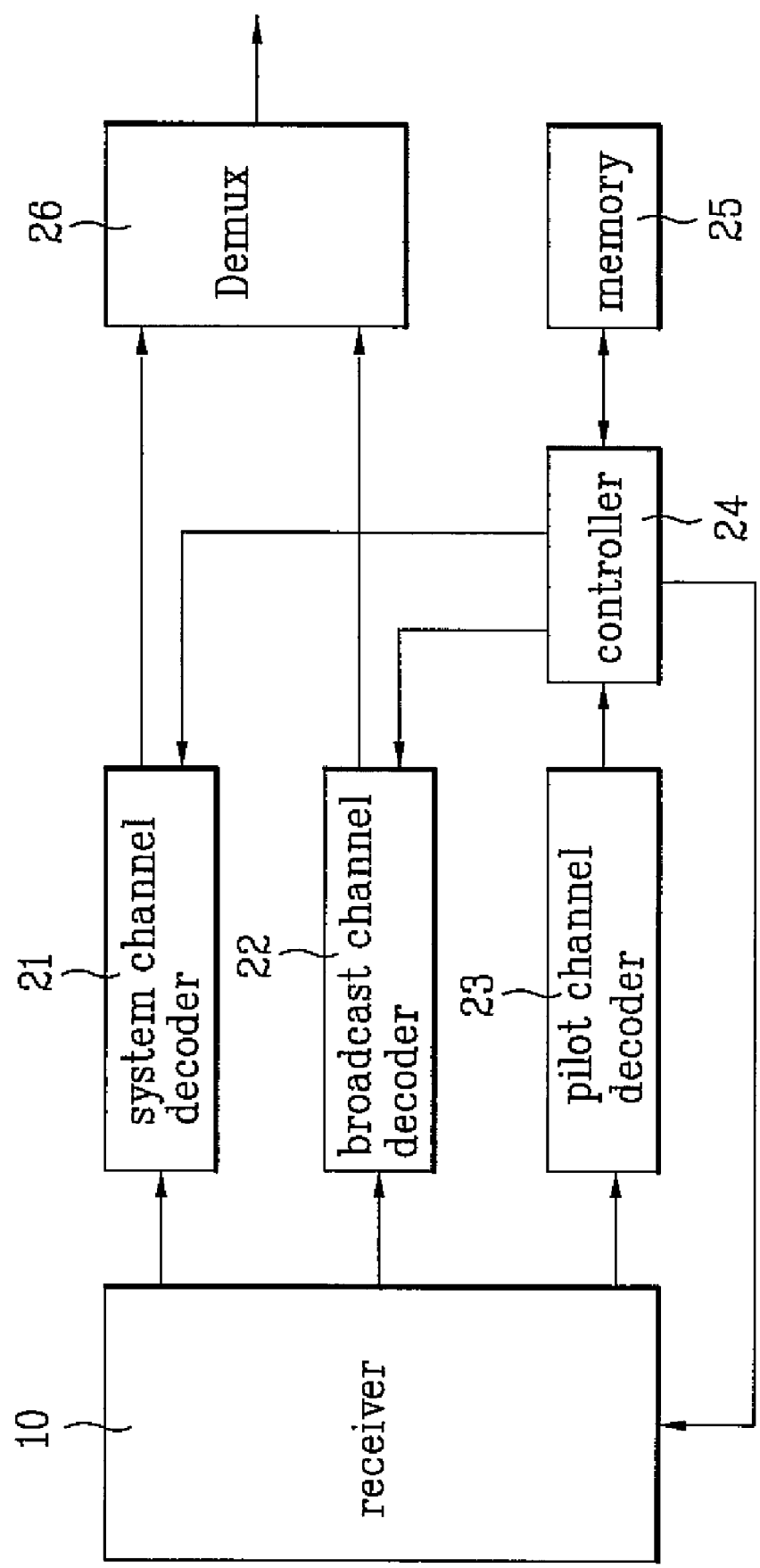
FIG. 2 is a schematic block diagram of a digital broadcast receiving terminal according to the present invention.

When the receiver operates, the receiver updates the stored information each time updated information is obtained, thereby keeping the stored information as recent as possible. FIG. 2 is a schematic block diagram of a terminal according to the present invention.

The terminal according to the present invention includes a receiving unit 10, a system channel decoder 21, a broadcast channel decoder 22, a pilot channel decoder 23, a controller 24, a memory 25, and a demultiplexer 26. The receiving unit 10 receives a digital multimedia broadcast transport stream. The system channel decoder 21 decodes system information such as CAS and EPG*-related information included in the transport stream received through the receiving unit 10. The broadcast channel decoder 22 decodes broadcast media (i.e., audio, video, and data) signals included in the transport stream received through the receiving unit 10. The pilot channel decoder 23 decodes a pilot synchronization signal received through another system channel. The memory 25 stores system information obtained from a recently received transport stream. The controller 24 provides a signal for controlling basic operations of the receiver using information that has been stored in the memory 25 in order to reduce the initialization time. The initialization includes an operation for extracting a Walsh code of a user selected channel. The demultiplexer 26 separates and extracts multiplexed video/audio/data signals received through the system channel decoder 21 and the broadcast channel decoder 22.

A description of the detailed configuration and operation of decoders 21, 22, and 23 is omitted here since they are well known in the art.

The highest priority information for system operation is CDM channel configuration information. The following is why stored CDM channel configuration information is used. In normal wireless environments, it generally takes more than 3.5 seconds to obtain PSI. A pilot channel, which carries CDM channel configuration information, can be obtained prior to PSI since no bit interleaving is applied to the pilot channel. For system operation, little change is made to CDM channel configuration information, SDT* information corresponding to a channel list, satellite transmission path information, NIT* information associated with a channel name, or the like, which is changed only when an overall broadcast reorganization such as a channel change or addition or a satellite DMB service change is done. Also in the case of PSI, it is not likely that different PIDs* are used for programs of the same channel.

In order to increase the utilization of the stored CDM channel configuration information, also when version information of the stored CDM channel configuration information is the same as that of received CDM channel configuration information, it is assumed that proper CDM channel configuration information has been obtained. Thus, the receiver uses at least the version information of CDM channel configuration information as a basis for determining whether or not the CDM channel configuration information has been updated when the receiver has failed to receive the entirety of the CDM channel configuration information in a weak electric field. In the present invention, the receiver attempts to start receiving a broadcast using stored values of the CDM channel configuration information and PSI/SI that is less likely to be changed, thereby reducing the delay time for initialization.

One embodiment of the inventive method uses stored CDM channel configuration information and PSI (PAT, PMT, and CAT)/SI and a second embodiment uses stored CDM channel configuration information and SI. If the receiver uses the CDM channel configuration information and PSI/SI stored for its initialization in a strong electric field, the delay time is reduced by about 4 seconds or more, provided that the CDM channel configuration information and PSI/SI is not updated. On the other hand, if the stored CDM channel configuration information and SI is used, the delay time is reduced by about 1 second or more, provided that the CDM channel configuration information and PSI/SI is not updated. In a weak electric field, it is possible to reduce the initialization delay time by more than in the strong electric field and thus to improve the initial reception rate.

Figure 3:
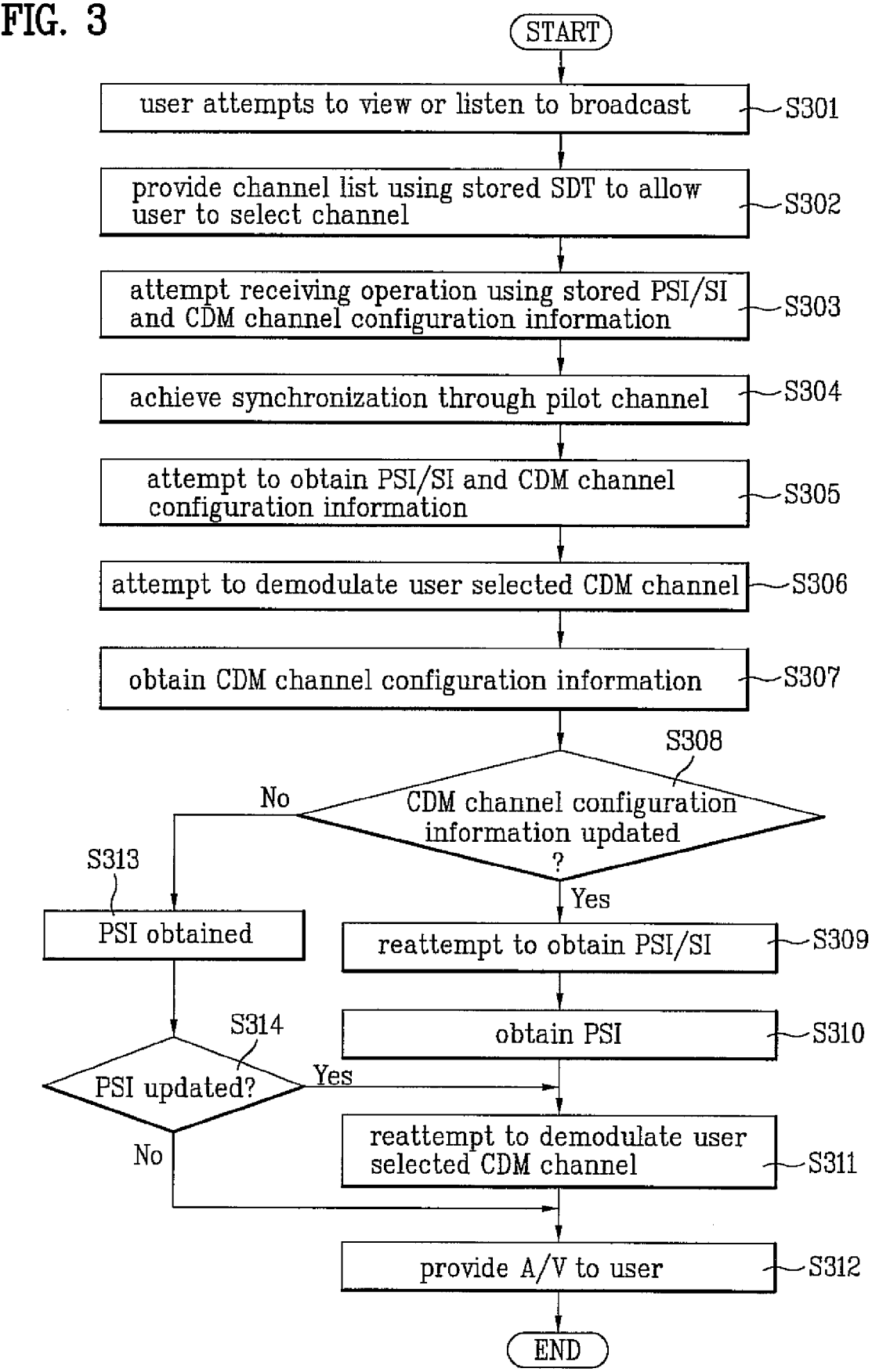
FIGS. 3 and 4 are flow charts of a digital broadcast receiving method according to an embodiment of the present invention.
Figure 4:
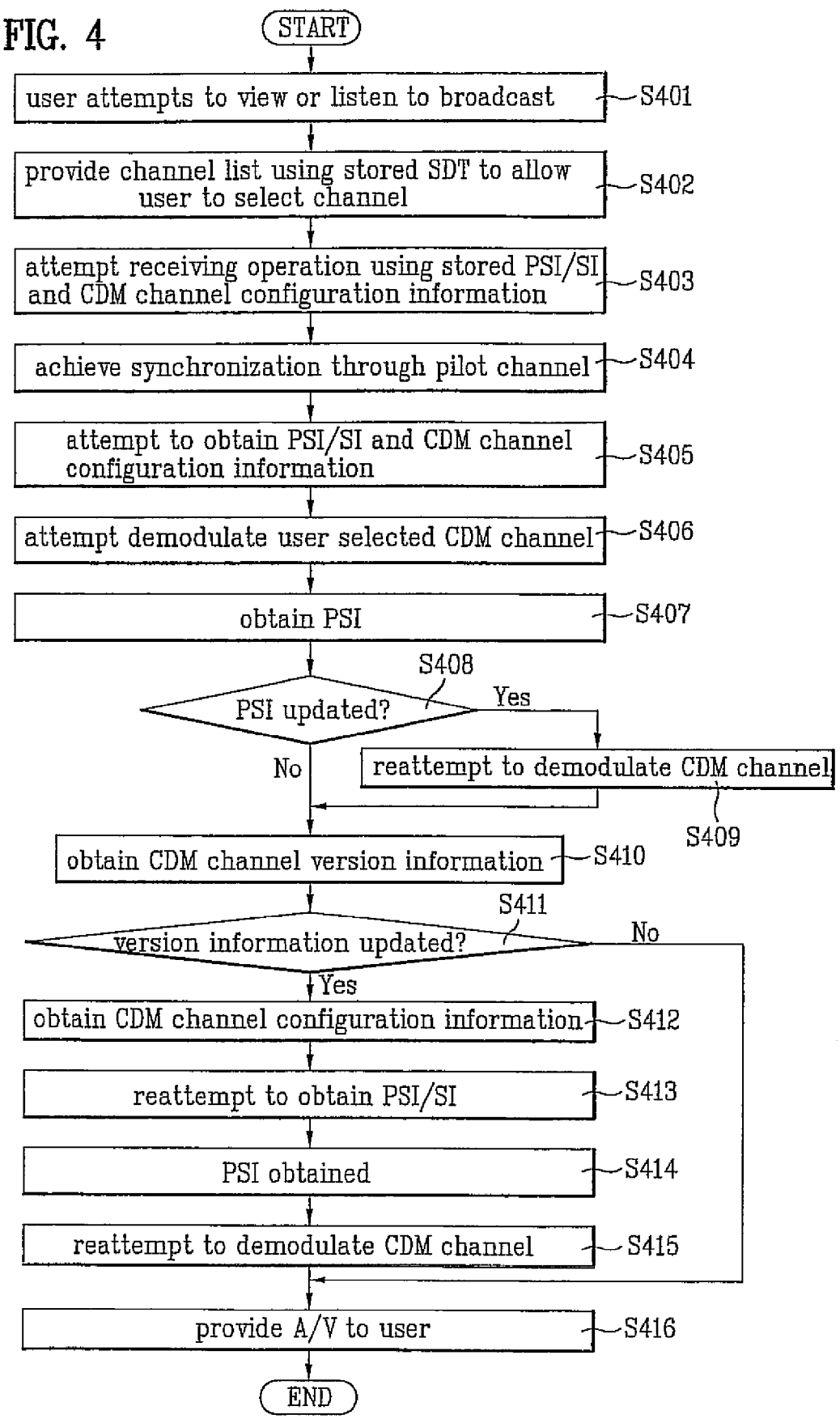

FIGS. 3 and 4 illustrate a digital broadcast receiving method according to an embodiment of the present invention in the case where CDM channel configuration information and PSI(PAT, PMT, CAT)/SI is used. In this case, demodulation of CDM channels for decoding an A/V channel corresponding to a channel actually selected by a user is initialized in advance using stored CDM channel configuration information and PSI/SI before actual CDM channel configuration information and PSI/SI is obtained from a received broadcast. This allows initializing for receiving a broadcast, provided that such information is not changed in normal channel environments.

FIG. 3 is a flow chart of a digital broadcast receiving method according to an embodiment of the present invention where CDM channel configuration information has been previously obtained.

When a user attempts to listen to or view a broadcast (S301), the receiver allows the user to select a channel using an SDT that has been stored in order to provide at least channel information such as a channel list and a channel name (S302).

The receiver starts a receiving operation using CDM channel configuration information and PSI/SI stored in an internal memory (S303).

The receiver then achieves pilot channel synchronization (S304). Only after the pilot channel synchronization is achieved, the receiver can properly demodulate the CDM channel.

After achieving the pilot channel synchronization, the receiver demodulates a CDM channel corresponding to a user selected channel using the stored CDM channel configuration information and PSI (PAT, PMT, and CAT)/SI (S306) while attempting to obtain actual CDM channel configuration information and PSI from a received broadcast that is actually being broadcast (S305).

In this embodiment, CDM channel configuration information is previously obtained from an actual broadcast signal as described above (S307).

The receiver then compares the obtained CDM channel configuration information with CDM channel configuration information currently stored in the memory to determine whether or not the obtained CDM channel configuration information has been updated (S308). If the CDM channel configuration information has been updated, the receiver re-attempts to obtain PSI/SI (S309) and obtains at least the PSI (S310). The receiver again demodulates a CDM channel corresponding to the user selected channel using the obtained PSI (S311) and provides audio/video to the user (S312).

If the CDM channel configuration information has not been updated, the receiver obtains PSI (S313) and determines whether or not the PSI has been updated (S314).

If the PSI has been updated, the receiver again demodulates a CDM channel corresponding to the user selected channel using the obtained PSI (S311) and provides audio/video to the user (S312).

If the PSI has not been updated, the receiver provides audio/video to the user without demodulating a new CDM channel (S312).

FIG. 4 is a flow chart of a digital broadcast receiving method according to an embodiment of the present invention where PSI is previously obtained. When a user attempts to listen to or view a broadcast (S401), the receiver allows the user to select a channel using an SDT* that has been stored in order to provide at least channel information such as a channel list and a channel name (S402).

The receiver starts receiving a broadcast using CDM channel configuration information and PSI/SI stored in an internal memory (S403).

The receiver then achieves pilot channel synchronization (S404). Only after the pilot channel synchronization is achieved, the receiver can properly demodulate the CDM channel.

After achieving the pilot channel synchronization, the receiver demodulates a CDM channel corresponding to a user selected channel using the stored CDM channel configuration information and PSI (PAT, PMT, and CAT)/SI (S406) while attempting to obtain CDM channel configuration information and PSI that is actually being broadcast (S405).

If PSI is obtained (S407), the receiver determines whether or not the obtained PSI has been updated (S408). If the PSI has been updated, the receiver proceeds to step S409 to again demodulate a CDM channel corresponding to the channel selected by the user.

The receiver then obtains at least version information of CDM channel configuration information, which is necessary to provide audio/video (S410).

The receiver checks the obtained version information to determine whether or not the version information has been updated (S411).

If the obtained CDM channel version information has been updated, the receiver obtains CDM channel configuration information (S412) and re-attempts to obtain PSI/SI and obtains at least the PSI (S413 and S414).

The receiver again demodulates a CDM channel corresponding to the user selected channel (S415) and provides audio/video to the user (S416).

If the obtained CDM channel version information has not been updated, the receiver provides audio/video to the user without demodulating a new CDM channel (S416).

Also in the above process, CDM channel configuration information and PSI/SI obtained while receiving a broadcast is stored as new data in the memory each time it is determined that the obtained CDM channel configuration information and PSI/SI has been updated.

Figure 5:
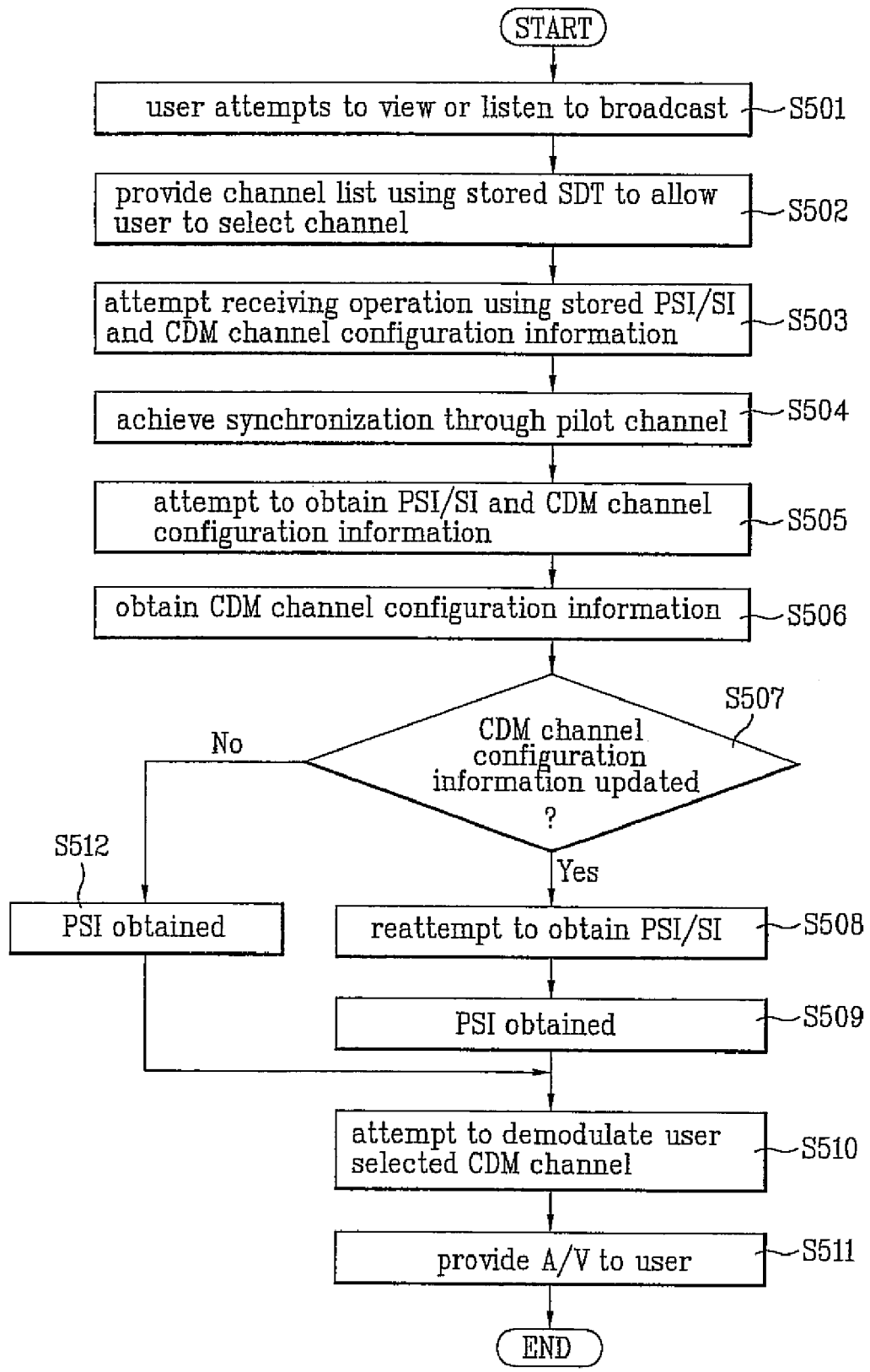
FIGS. 5 and 6 are flow charts of a digital broadcast receiving method according to another embodiment of the present invention.
Figure 6:
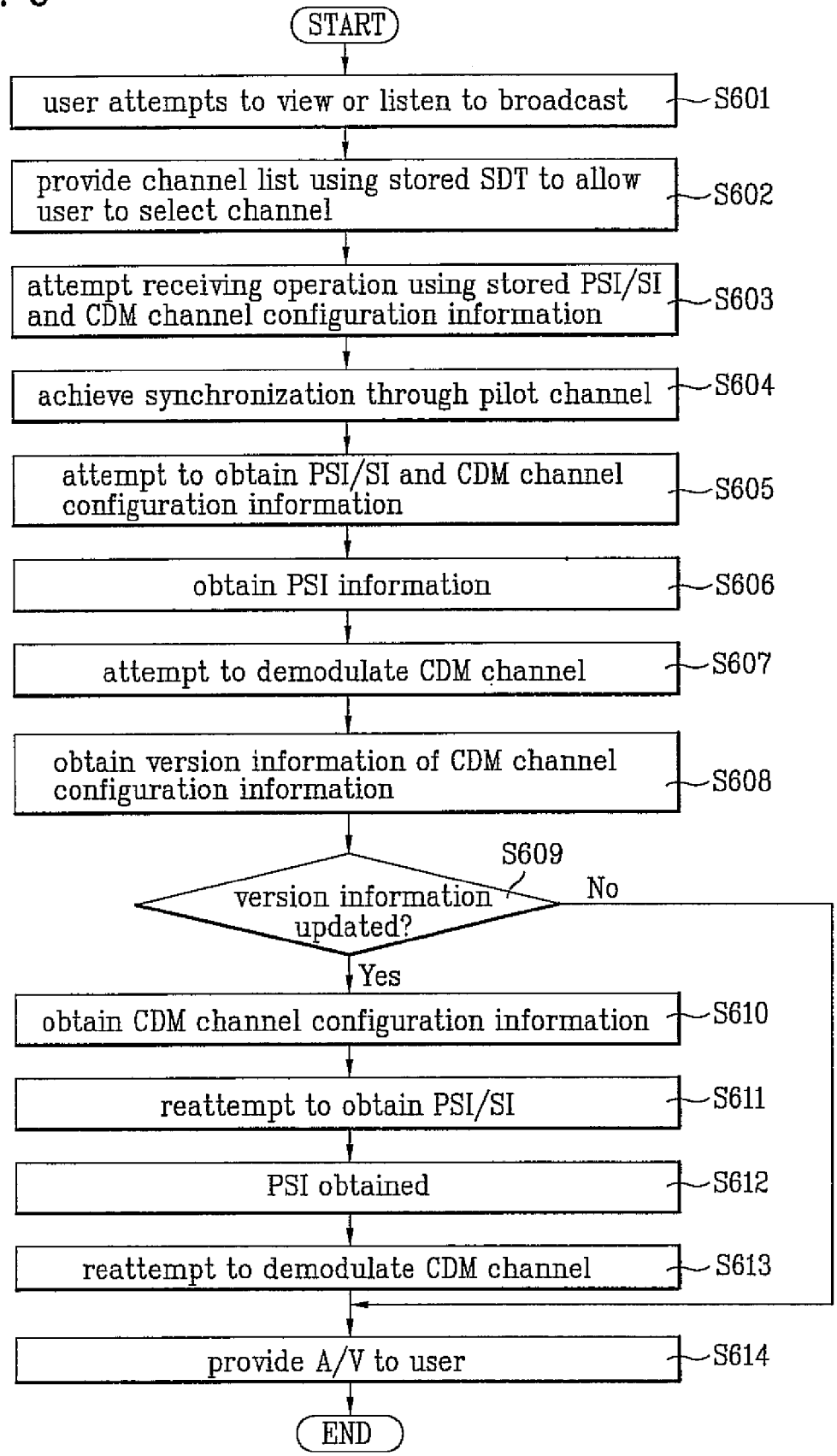

FIGS. 5 and 6 illustrate a digital broadcast receiving method according to another embodiment of the present invention in the case where CDM channel configuration information and SI stored in the internal memory of the terminal is used. When attempting to obtain CDM channel configuration information and PSI/SI, the terminal performs either a process illustrated in FIG. 5 or a process illustrated in FIG. 6 depending on whether the terminal previously receives CDM channel configuration information or previously receives PSI/SI. Because the time required to obtain CDM channel configuration information is less than the time required to obtain PSI in general wireless environments, this embodiment reduces initialization time by the time required to obtain CDM channel configuration information, provided that the CDM channel configuration information is not updated. In this embodiment, the receiver starts decoding an A/V channel corresponding to a user selected channel after obtaining PSI.

FIG. 5 is a flow chart of a digital broadcast receiving method according to an embodiment of the present invention where CDM channel configuration information is previously obtained.

When a user attempts to listen to or view a broadcast (S501), the receiver allows the user to select a channel using an SDT* that has been stored in order to provide at least channel information such as a channel list and a channel name to the user (S502).

The receiver starts a receiving operation using CDM channel configuration information and SI stored in an internal memory (S503).

The receiver then achieves pilot channel synchronization (S504). Only after the pilot channel synchronization is achieved, the receiver can properly demodulate the CDM channel.

After achieving the pilot channel synchronization, the receiver attempts to obtain CDM channel configuration information and PSI/SI that is actually being broadcast (S505) and obtains CDM channel configuration information (S506).

That is, the receiver attempts a receiving operation using SI and CDM channel configuration information stored in the memory and, if pilot channel synchronization is achieved, then the receiver attempts to obtain PSI/SI and CDM channel configuration information.

In this embodiment, CDM channel configuration information is previously obtained from an actual broadcast signal as described above (S506). The receiver then compares the obtained CDM channel configuration information with CDM channel configuration information currently stored in the memory to determine whether or not the obtained CDM channel configuration information has been updated (S507).

If it is determined that the CDM channel configuration information has not been updated, the receiver obtains PSI (specifically, PAT, PMT, and CAT information associated with the channel actually selected by the user) (S512) and attempts to demodulate a CDM channel corresponding to the user selected channel (S510).

The receiver then provides audio/video to the user (S511).

If the previously obtained CDM channel configuration information has been updated, the receiver re-attempts to obtain PSI/SI (S508). When the PSI has been obtained (S509), the receiver demodulates a CDM channel corresponding to the user selected channel (S510) and provides audio/video to the user (S511).

FIG. 6 is a flow chart of a digital broadcast receiving method according to an embodiment of the present invention where PSI is previously obtained from an actual broadcast signal with CDM channel configuration information and SI stored in the memory.

The receiver attempts a receiving operation using SI and CDM channel configuration information stored in the memory and, if pilot channel synchronization is achieved, then the receiver attempts to obtain PSI/SI and CDM channel configuration information (S601-S605). A detailed description of steps S601-S605 is omitted since they are similar to the above steps S501-S505 of FIG. 5.

If PSI is previously obtained (S606), then the receiver attempts to demodulate a CDM channel using the obtained PSI (S607).

The receiver then obtains at least version information of CDM channel configuration information, which is necessary to provide audio/video (S608).

The receiver compares version information of the CDM channel configuration information stored in the memory with the obtained version information to determine whether or not the obtained version information has been updated (S609). For example, the version information of the CDM channel configuration information is 3 bits long.

If the obtained version information has been updated, the entire CDM channel configuration information has been changed and thus the receiver obtains CDM channel configuration information as the conventional receiver (S610).

The receiver then re-attempts to obtain PSI/SI (S611). If the PSI/SI has been obtained (S612), the receiver demodulates a CDM channel corresponding to the user selected channel (S613) and provides audio/video to the user (S614).

If the obtained version information of the CDM channel configuration information has not been updated, the receiver provides audio/video to the user using an already demodulated channel signal (S614). The receiver continuously monitors CDM channel configuration information and PSI/SI while receiving the broadcast to determine whether or not it has been updated. If it is determined that the CDM channel configuration information and PSI/SI has been updated, the receiver stores it in the memory.

As is apparent from the above description, the present invention has a variety of advantages.

For example, a receiver attempts to receive a broadcast using stored values of CDM channel configuration information and PSI/SI that is less likely to be changed, thereby reducing a delay time when entering its initial receiving operation.

If the receiver uses the CDM channel configuration information and PSI/SI stored for its fast operation in a strong electric field, the delay time is reduced by about 4 seconds or more, provided that the CDM channel configuration information and PSI/SI is not updated. On the other hand, if the stored CDM channel configuration information and SI is used, the delay time is reduced by about 1 second or more, provided that the CDM channel configuration information and PSI/SI is not updated. In a weak electric field, it is possible to reduce the delay time by more than in the strong electric field and thus to improve the initial reception rate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving a digital broadcast in a broadcast receiving terminal, the method comprising:
   storing, by the terminal in a memory of the terminal, a system information obtained from a recently received broadcast, wherein the system information comprises at least one of Code Division Multiplexing (CDM) channel configuration information, Program Specific Information (PSI), and Service Information (SI);

providing a stored Service Description Table (SDT) to select a channel to a user;

performing an initial receiving operation using the stored system information;

performing pilot channel synchronization to obtain an actual CDM channel configuration information, PSI and SI from a received broadcast that is actually being broadcast;

demodulating a CDM channel corresponding to the user selected channel using the stored system information before the actual CDM channel configuration information, PSI and SI is obtained;

when the actual CDM channel configuration information, PSI and SI is obtained, comparing the obtained actual CDM channel configuration information, PSI, and SI with the stored system information; and determining an operation of a receiver to be performed according to a result of the comparison.

2. The method according to claim 1, wherein performing the initial receiving operation includes extracting a Walsh code of the user selected channel.

3. The method according to claim 1, further comprising:
updating the stored system information with the obtained actual CDM channel configuration information if the result of comparing the obtained actual CDM channel configuration information is different from the stored system information.

4. The method according to claim 3, wherein decoding an audio/video channel is restarted only when the result of the comparison is that PSI of a user selected channel has been updated.

5. The method according to claim 1, wherein the terminal is a satellite Digital Multimedia Broadcasting (DMB) terminal or a combined satellite/terrestrial DMB terminal.

6. A digital broadcast receiving terminal, comprising:
a receiving unit configured to receive a digital multimedia broadcast transport stream;
a decoder configured to decode data included in the transport stream;
a memory configured to store system information obtained from a recently received transport stream, wherein the system information comprises at least one of Code Division Multiplexing (CDM) channel configuration information, Program Specific Information (PSI), and Service Information (SI); and
a controller configured to:
provide a stored Service Description Table (SDT) to select a channel to a user,
perform an initial receiving operation using the stored system information,
perform pilot channel synchronization to obtain an actual CDM channel configuration information, PSI and SI from a received broadcast that is actually being broadcast,
demodulate a CDM channel corresponding to the user selected channel using the stored system information before the actual CDM channel configuration information, PSI and SI is obtained,
when the actual CDM channel configuration information, PSI and SI is obtained, compare the obtained actual CDM channel configuration information, PSI and SI with the stored system information, and
determine an operation of the receiving unit to be performed according to a result of the comparison.

7. The terminal according to claim 6, wherein the performing the initial receiving operation comprises extracting a Walsh code of a user selected channel.

8. The terminal according to claim 6, wherein the decoder comprises:
a system channel decoder that decodes system information received through a system channel;
a broadcast channel decoder that decodes broadcast media information received through a broadcast channel; and
a pilot channel decoder that decodes a pilot synchronization signal received through another system channel.

9. The terminal according to claim 6, wherein the terminal is a satellite Digital Multimedia Broadcasting (DMB) terminal or a combined satellite/terrestrial DMB terminal.

* * * * *